(12) United States Patent  (10) Patent No.: US 7,887,764 B2
Jernberg  (45) Date of Patent: Feb. 15, 2011

(54) MIXER WITH A CATALYTIC SURFACE

(76) Inventor: Gary R. Jernberg, 2283 Northridge Dr., North Mankato, MN (US) 56003

( * ) Notice: Subject to any disclaimer, the term of this patent is extended or adjusted under 35 U.S.C. 154(b) by 613 days.

(21) Appl. No.: 11/857,150

(22) Filed: Sep. 18, 2007

(65) Prior Publication Data

US 2009/0071336 A1   Mar. 19, 2009

(51) Int. Cl.
*B01J 19/20* (2006.01)
(52) U.S. Cl. .................. 422/224; 422/225; 422/229; 366/273; 366/279; 366/339; 366/340
(58) Field of Classification Search ............... 422/224, 422/225, 229, 215, 205; 366/339, 273, 279, 366/340
See application file for complete search history.

(56) References Cited

U.S. PATENT DOCUMENTS

| | | | |
|---|---|---|---|
| 1,815,177 A | | 7/1931 | Balachowsky et al. |
| 1,834,818 A | | 12/1931 | Balachowsky et al. |
| 2,526,657 A | | 10/1950 | Guyer |
| 2,709,128 A | | 5/1955 | Krause |
| 2,778,610 A | | 1/1957 | Ernest |
| 3,917,811 A | * | 11/1975 | Grout et al. ............. 435/174 |
| 4,093,188 A | * | 6/1978 | Horner ................... 366/336 |
| 4,121,909 A | | 10/1978 | Cronauer et al. |
| 4,134,908 A | | 1/1979 | Steiner et al. |
| 4,302,490 A | | 11/1981 | Byrd |
| 4,340,501 A | | 7/1982 | Davidson |
| 4,348,360 A | | 9/1982 | Chang et al. |
| 4,400,309 A | | 8/1983 | McMahon et al. |
| 4,429,665 A | | 2/1984 | Brown |
| 4,568,583 A | * | 2/1986 | Twigg .................... 122/44.2 |
| 4,582,638 A | * | 4/1986 | Homer et al. ............ 588/16 |
| 4,665,973 A | | 5/1987 | Limberg et al. |
| 4,784,218 A | | 11/1988 | Holl |
| 5,320,428 A | | 6/1994 | Streiff |
| 5,404,913 A | | 4/1995 | Gilligan |
| 5,451,273 A | | 9/1995 | Howard et al. |
| 5,791,779 A | * | 8/1998 | Smith, Sr. ............... 366/297 |
| 6,187,274 B1 | | 2/2001 | Nilsson |

(Continued)

FOREIGN PATENT DOCUMENTS

WO   WO 2005/115617 A1   12/2005

OTHER PUBLICATIONS

Collins et al., "Little Green Molecules," Scientific American, Mar. 2006, pp. 84-90.

(Continued)

*Primary Examiner*—N. Bhat
(74) *Attorney, Agent, or Firm*—Hamre, Schumann, Mueller & Larson, P.C.

(57) ABSTRACT

A mixer and mixer assembly for turbulent mixing and enhancing a chemical reaction is provided. A method for using a mixer and mixer assembly for treatment of fluids is also provided. The mixer generally includes a first and second end, a surface configured for turbulent mixing, a catalyst supported thereon, and surface structure configured to increase interaction of catalyst and reactant. The mixer assembly generally includes a mixer inserted inside a fluid container or a tube and may also include a catalytic sleeve for enhancing interaction between catalyst and reactant.

19 Claims, 9 Drawing Sheets

U.S. PATENT DOCUMENTS

| | | |
|---|---|---|
| 6,203,771 B1 | 3/2001 | Lester et al. |
| 6,205,984 B1 | 3/2001 | Renard |
| 6,277,340 B1 | 8/2001 | Paikert et al. |
| 6,461,574 B2 * | 10/2002 | Korhonen et al. ........... 422/136 |
| 6,488,016 B2 | 12/2002 | Kavonius |
| 6,576,199 B1 | 6/2003 | Liu et al. |
| 6,585,237 B2 * | 7/2003 | Pagade ........................ 261/94 |
| 6,619,043 B2 | 9/2003 | Bruck et al. |
| 6,781,024 B2 * | 8/2004 | Butler et al. ................ 585/440 |
| 6,855,272 B2 | 2/2005 | Burlingame et al. |
| 6,921,738 B2 | 7/2005 | Hwang et al. |
| 6,962,193 B2 | 11/2005 | Liu et al. |
| 7,261,866 B1 | 8/2007 | Kadowaki et al. |
| 7,595,029 B2 * | 9/2009 | Welp et al. .................. 422/129 |
| 2002/0198429 A1 | 12/2002 | Ramani et al. |
| 2004/0085853 A1 | 5/2004 | Kohlgruber et al. |
| 2006/0008399 A1 | 1/2006 | Feinstein |
| 2007/0131585 A1 | 6/2007 | Koch |

OTHER PUBLICATIONS

"Kenics Static Mixing Technology," Bulletin 800, Robbins & Myers, Inc., 1998, pp. 1-12.

International Search Report for PCT/US2008/073162, mailed Jan. 8, 2010.

* cited by examiner

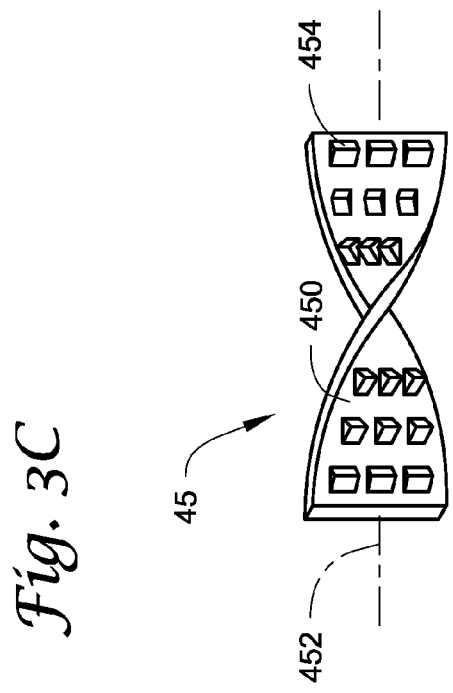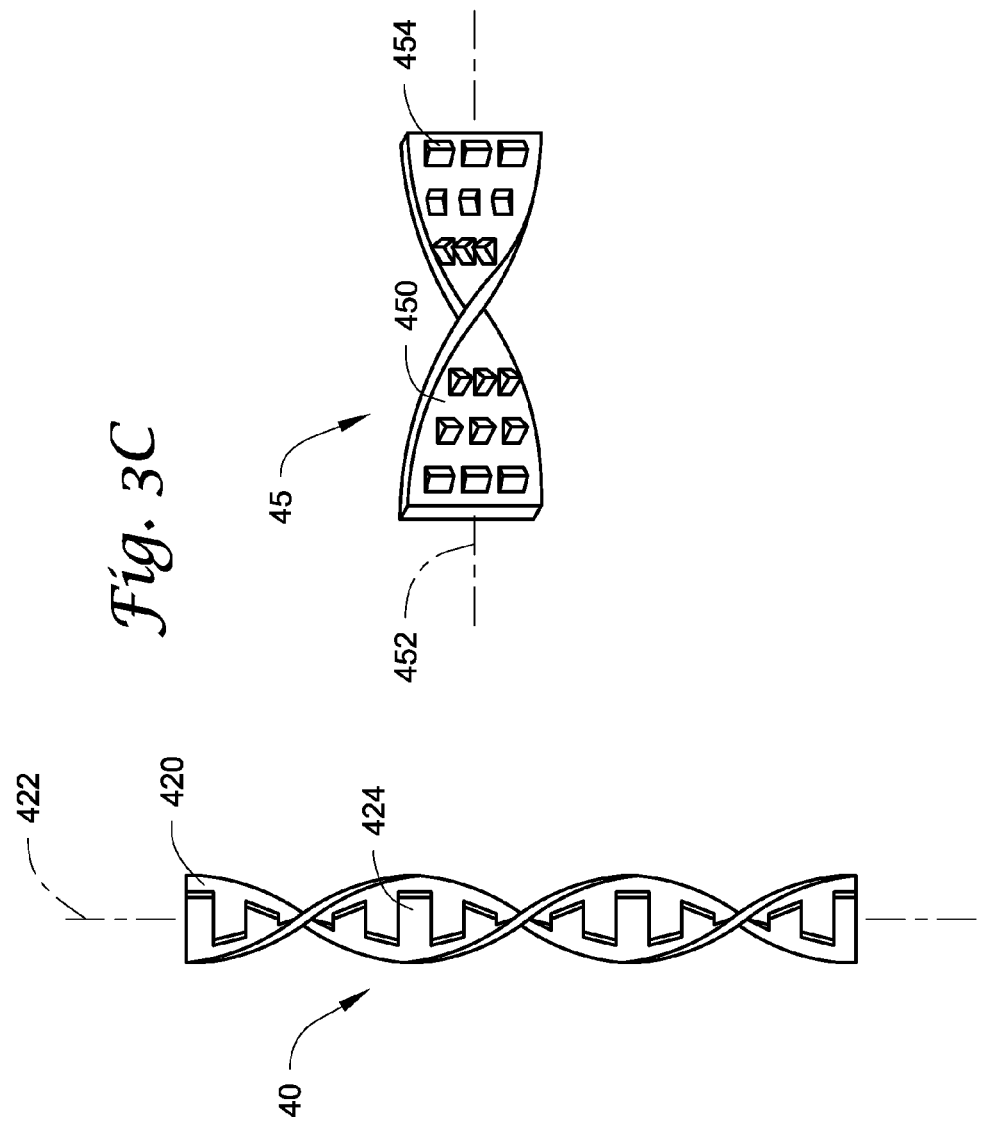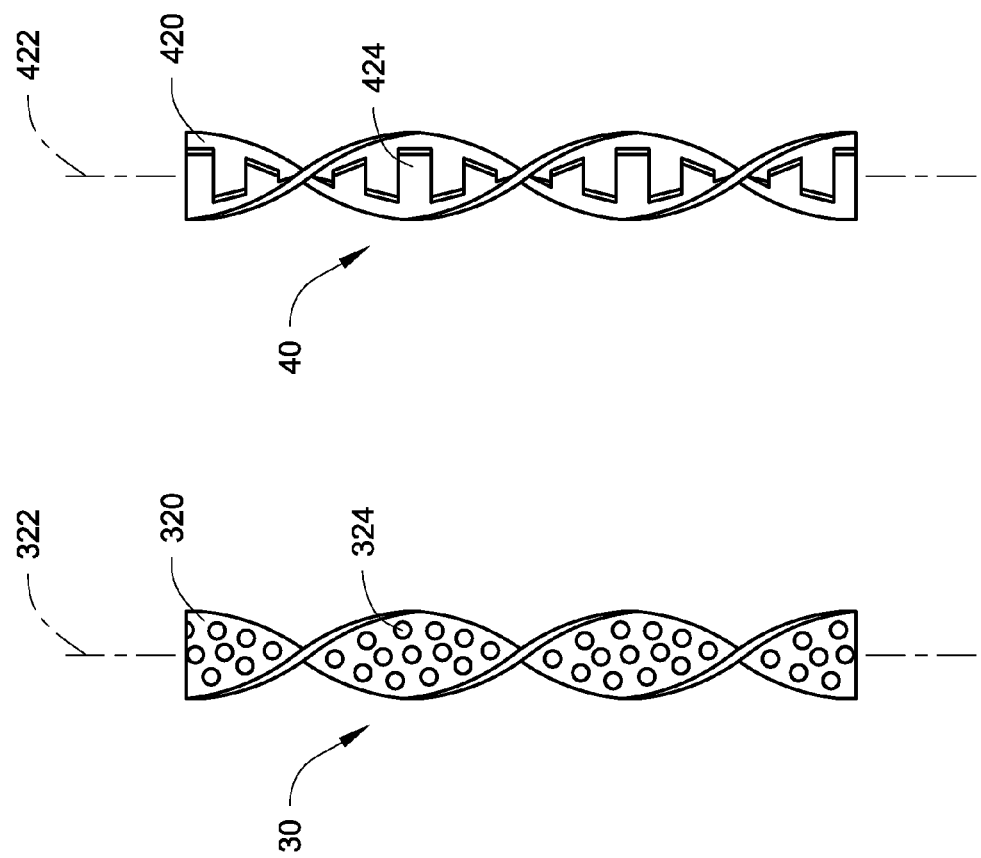

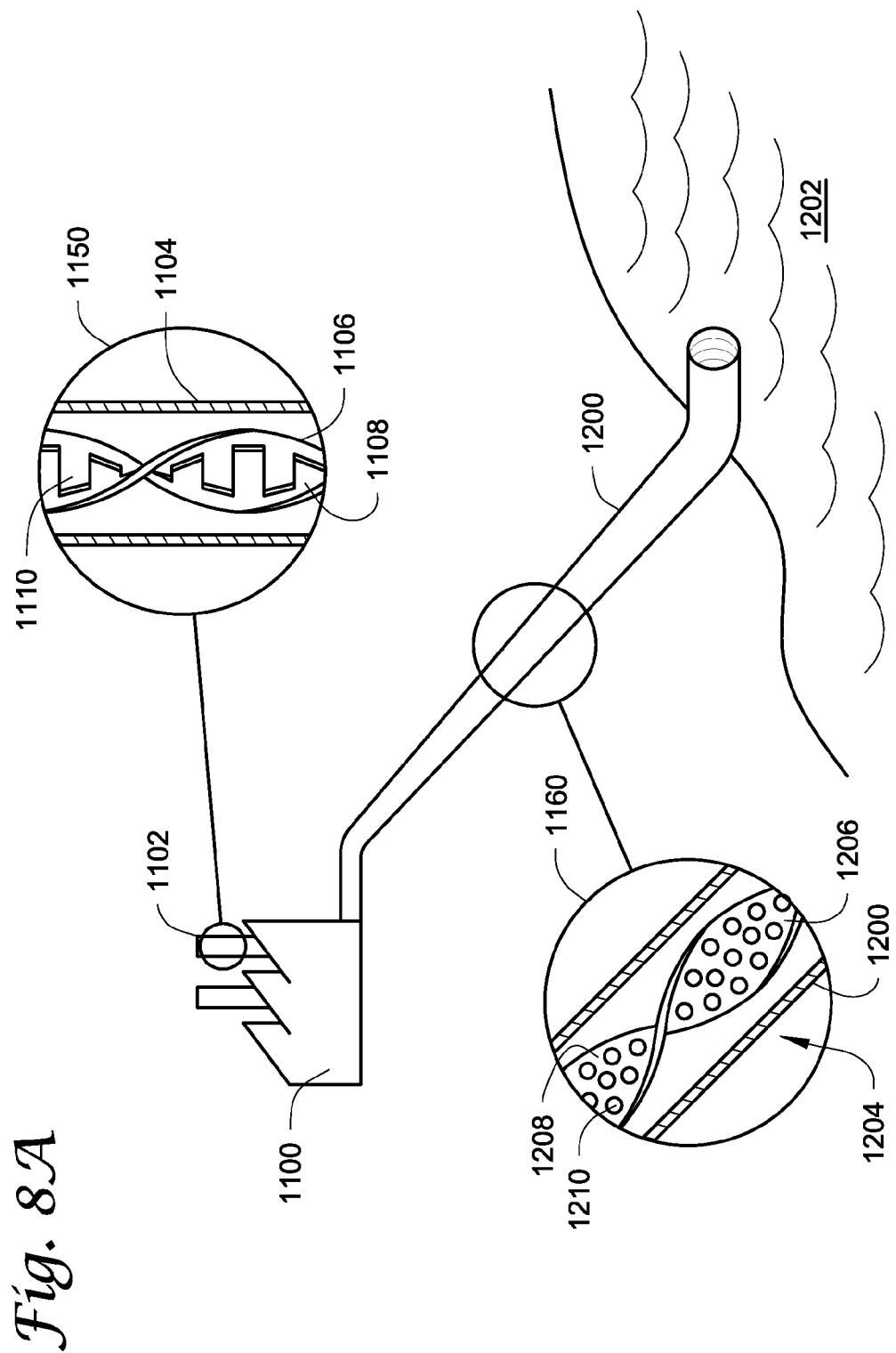

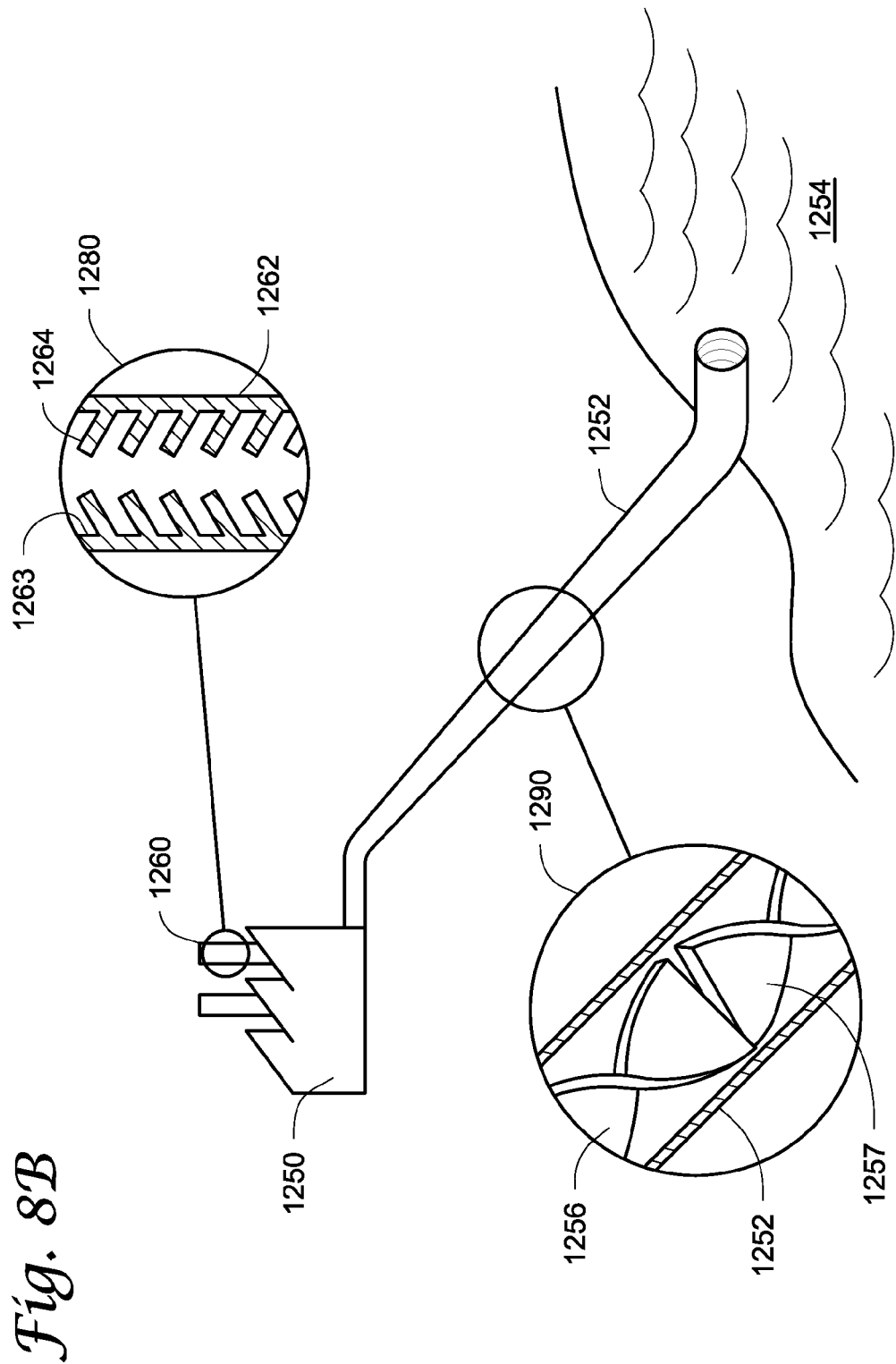

MIXER WITH A CATALYTIC SURFACE

BACKGROUND OF THE INVENTION

The present invention generally relates to a mixer and a method for mixing chemical compounds.

It is well known in the art that turbulent mixing is one method of mixing of chemical compounds. Turbulent mixing allows more frequent interaction between the reactive chemical compounds. Various types of mixing devices for turbulent mixing are already known in the art.

It is also known in the art that some chemical reactions may be enhanced by a catalyst. In general, a catalyst is believed to enhance a reaction by providing an alternate route to the reaction wherein the activation energy is lower than the activation energy of the original route of the chemical reaction without the catalyst. It is believed that a catalyst participates in a reaction but is neither a reactant nor a product of the reaction it catalyzes. A catalyst is itself not consumed by the overall reaction.

Accordingly, improved devices for mixing and for enhancing chemical reactions are desirable.

BRIEF SUMMARY OF THE INVENTION

Embodiments disclosed herein relate to a mixer and a mixer assembly for turbulent mixing of chemical compounds and for enhancing a chemical reaction of reactants to produce a product. Embodiments disclosed herein include a mixer with a catalytic surface wherein the chemical reaction is enhanced by a catalyst. The embodiments also disclose a mixer having surface features which allow for enhanced interaction between a catalyst and chemical compounds. The present disclosure also relates to mixer assemblies for batch mixing and continuous mixing of chemicals. Other embodiments disclosed herein include method of treatment of fluids from an industrial complex.

Mixers and mixer assemblies for turbulent mixing of a fluid and enhancing a chemical reaction are disclosed herein. Such mixers and mixer assemblies have use in a variety of manners. For example such mixers and mixer assemblies may be used in laboratories for small scale reactions. As another example, such mixers and mixer assemblies may be used in industry for large scale reactions for manufacturing. As yet another example, such mixers and mixer assemblies may be part of an industrial complex and/or building structures wherein effluent chemicals are altered prior to their release into the environment. These and other uses will be readily understood and appreciated by those skilled in the art based upon the disclosure herein.

One embodiment of a mixer has an elongated shape with a surface configured for turbulent mixing of a fluid. Fluid, as defined herein, includes, for example, liquid, gas, small particulate solids, and any combinations thereof. Liquid examples include, but are not limited to, power or paper plant effluents. Gas examples include, but are not limited to, $NO_x$, $SO_x$, $CO$, $CO_2$, $O_2$, $CH_4$, and $H_2$. Particulate solid examples include, but are not limited to, polymer pellets, or smaller segments of polymers for making longer polymers. The embodiment of the mixer includes a catalyst supported on the surface and surface configured to increase the interaction between the catalyst and chemical reactants when the mixer is used.

In another embodiment, the surface has a helix-like configuration. A helix-like configuration may include a central rod wherein a ribbon-like surface rotates about the rod in a helical path. Thus, a helix-like configuration includes screw-like configurations. In another embodiment, a helix-like configuration lacks a central rod running along the major axial length of the mixer. The helical turn may be right-handed, left-handed, or both.

In another embodiment, the mixer includes a catalytic sleeve that surrounds the mixer and provides an additional catalytic surface for enhancing a chemical reaction.

In another embodiment, a motor is connected to a mixer. Thus, the motor rotates the mixer causing turbulent mixing of a fluid and/or chemicals.

In yet another embodiment, a magnet is connected at an end of a mixer and rotation of a mixer may be accomplished by a magnetic field.

Other aspects also include mixer assemblies. In one embodiment, a mixer assembly includes a fluid container for batch mixing, wherein a mixer of appropriate configuration is inserted inside the fluid container. In another embodiment, the fluid container is in contact with a temperature control device. In yet another embodiment, the fluid container is in positioned substantially near a magnetic field generator.

In yet another embodiment, a mixer assembly includes a tube for continuous mixing, wherein a mixer of appropriate configuration is inserted inside the tube. At one end of the tube, a fluid and/or chemicals enter and flow through the tube, affected by the mixer, and exit out the other end of the tube. In yet another embodiment, the assembly may include a catalytic sleeve positioned inside the tube and radially between the mixer and the inside surface of the tube wherein the catalytic sleeve provides an additional catalytic surface for enhancing a chemical reaction.

In another embodiment, a mixer assembly includes a tube for continuous mixing, a mixer member, wherein a mixer member includes at least two segments, one segment having a helix-like configuration and another segment having a plurality of surfaces, wherein at least a portion of a surface supports a catalyst. It is preferable that there are more than two segments. It is also preferable that a segment having a helix-like configuration and a segment having a plurality of surfaces are positioned in an alternating fashion along a major axis of the tube.

In another embodiment, a mixer having a first segment and a second segment, the first segment, having a mixer surface configured for turbulent mixing of the fluid; and the second segment, having at least one surface, wherein at least a portion of the surface supports a catalyst, wherein the first segment and the second segment are linearly positioned and parallel to the mixer major axis.

Other embodiments include methods of reducing chemical byproducts that are harmful to the environment, produced from an industrial complex. A method of reducing harmful chemicals from gases is one such embodiment. A method of treating effluents that flow into a water source is another embodiment.

These and other features will be better understood with reference to the following drawings, descriptions, and claims.

BRIEF DESCRIPTION OF THE SEVERAL VIEWS OF THE DRAWINGS

FIG. 3A is a side view of another embodiment of a mixer illustrating an example of a mixer surface having a helix-like configuration and hemispherical surface structures thereon configured to increase interaction of catalysts and the fluid.

FIG. 3B is a side view of another embodiment of a mixer illustrating ridged surface structures configured to increase interaction of catalysts thereon and the fluid.

FIG. 3C is a perspective view of another embodiment of a mixer illustrating a plurality of repeating raised surface structures attached to the surface.

FIG. 8A is a view of embodiments of a mixer assembly wherein two different embodiments are illustrated to be in use at an industrial complex.

FIG. 8B is a view of embodiments of a mixer assembly wherein two different embodiments are illustrated to be in use at an industrial complex.

DETAILED DESCRIPTION OF THE INVENTION

Figure 1:
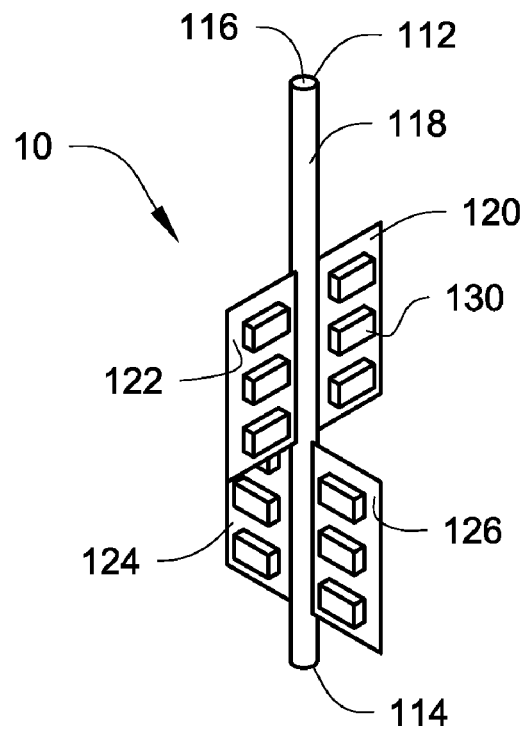
FIG. 1 is a perspective view of an embodiment of a mixer illustrating an example of a mixer surface configured for turbulent mixing of a fluid and a mixer surface having surface structure configured to increase interaction of catalysts thereon and the fluid.

A mixer according to one embodiment is shown in FIG. 1. The embodiment is a mixer 10 having a mixer first end 112, a mixer second end 114, and a mixer major axis 116 extending from the mixer first end 112 to the mixer second end 114. FIG. 1 illustrates an embodiment wherein a central rod 118 is connected to at least one surface 120 configured for turbulent mixing. Although FIG. 1 illustrates a mixer 10 having four surfaces 120, 122, 124, 126 having square shapes extending radially out from the central rod 118, those skilled in the art would appreciate that other shapes, number of surfaces, and arrangements may also be utilized. The surfaces 120, 122, 124, 126 of FIG. 1 support a catalyst. It may be preferable that a catalyst is a type of a Noble metal or a Noble metal alloy. Noble metals are metals that are resistant to corrosion or oxidation, unlike most base metals. Examples of Noble metals are, but not limited to, gold, silver, tantalum, platinum, palladium and rhodium. It may also be preferable that a catalyst is a biological catalyst. A biological catalyst is a biological molecule having a catalytic effect. Examples of a biological molecule include, but are not limited to, enzymes, a single strand or double strand DNA, RNA, Amino Acids, lipids, phospholipids, proteins, metalloproteins, coenzymes, and combinations thereof. Those skilled in the art would readily recognize and appreciate that other types of catalysts may also be utilized.

FIG. 1 also illustrates an example of surface structure 130 configured to increase interaction of the catalyst supported on the surface with chemical reactants when mixing. As illustrated in FIG. 1, such configuration may be a raised portion on the surface to increase the amount of surface area supporting the catalyst. Accordingly, the contact area of catalyst to fluid is increased. Other examples of such surface structures are illustrated herein. Those skilled in the art would readily recognize and appreciate that other structures may also be utilized to achieve the same effect. It is believed that such an increased contact area of catalyst would increase the probability of interaction between the catalyst and reactant chemical compounds in the fluid. Accordingly, such an increase would enhance the overall chemical reaction by, for example and not limited to, parameters of faster reaction time of reactants, faster production of a product, and/or a more efficient use of reactants to produce a better yield of products.

Figure 2:
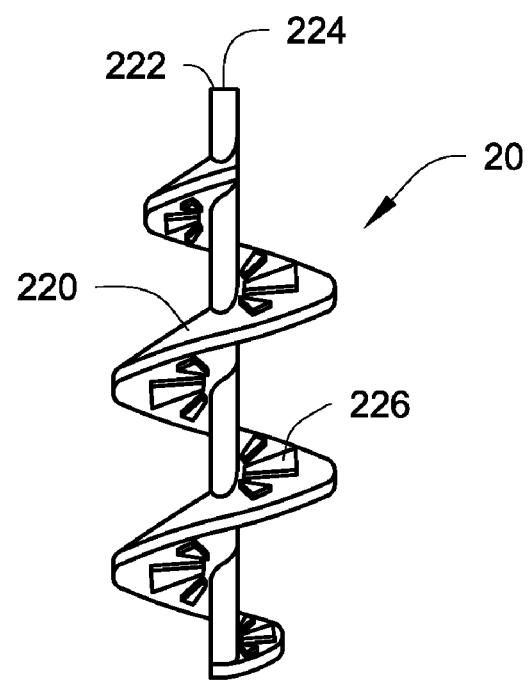
FIG. 2. is a side view of another embodiment of a mixer illustrating an example of a mixer surface having a helix-like configuration and ridged structures thereon configured to increase interaction of catalysts and the fluid.

In FIG. 2, an embodiment of a mixer 20 is illustrated wherein a mixer surface 220 has a helix-like configuration. In this embodiment, a mixer surface 220 resembles a ribbon having a helical configuration along a central rod 222, which defines a mixer major axis 224 of the embodiment. The helix-like mixer surface 220 has surface structures 226, for example, raised ridges radiating from the central rod 222, configured to increase the surface area and generate turbulence in mixing. The embodiment in FIG. 2 supports a catalyst on the helix-like surface, and at the raised ridges 226 radiating from and away from the central rod 222. Accordingly, the contact area of catalyst to fluid is increased.

FIGS. 3A, 3B, and 3C illustrate other embodiments of a mixer, 30, 40, 45, with a surface having a helix-like configuration. Each of the embodiments of a mixer, 30, 40, 45, has a mixer surface 320, 420, 450 that has at least two major surfaces which twist around a central axis 322, 422, 452. The twisting around a central axis may be a left-handed helix-like twisting, a right-handed helix-like twisting, or a combination of both.

Referring to FIG. 3A, the embodiment of a mixer 30 illustrates an example of a mixer surface 320 having a scattered raised hemispherical surface structures 324. These structures are another example of configurations to increase interaction of catalysts and the fluid.

Referring to FIG. 3B, the embodiment of a mixer 40 illustrates an example of a mixer surface 420 having a regularly repeating alternating raised and depressed ridge-and-valley surface structures 424.

Referring to FIG. 3C, the embodiment of a mixer 45 illustrates an example of a mixer surface 450 having a plurality of protruding structures radiating away from the mixer major axis and connected to the surface at an angle 454. The plurality of protruding structures 454 may be connected to the surface 450 at a perpendicular angle or any other angle. In another embodiment, a plurality of protruding structures may be connected to a central rod that is substantially parallel to the mixer major axis, wherein the plurality of protruding structures are substantially wire shaped. In this embodiment, at least a portion of the plurality of protruding structures supports a catalyst. Accordingly, the plurality of protruding structures having a catalyst has a high surface area and at the same time cause turbulent mixing of the fluid.

As illustrated in FIGS. 3A, 3B, and 3C, a surface structure 324, 424, 454, configured to increase interaction of catalyst and fluid may be, for example and not limited to, raised portions, depressed portions, hemispherical bumps, hemispherical depressions, ridges, valleys, or any combinations thereof. Those skilled in the art would readily recognize and appreciate that other structures may also be utilized to achieve increased interaction between catalyst and fluid.

Figure 4A:
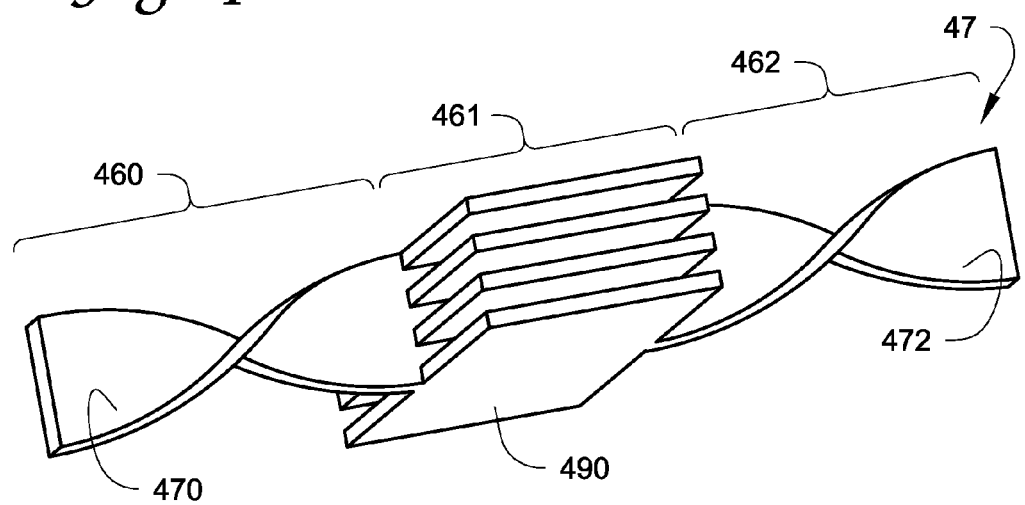
FIG. 4A is a perspective view of another embodiment of a mixer illustrating a mixer with three segments, first and third segments having mixer surfaces having helix-like configurations for turbulent mixing of a fluid and second segment having a at least one surface wherein at least a portion of the surface supports a catalyst.
Figure 4B:
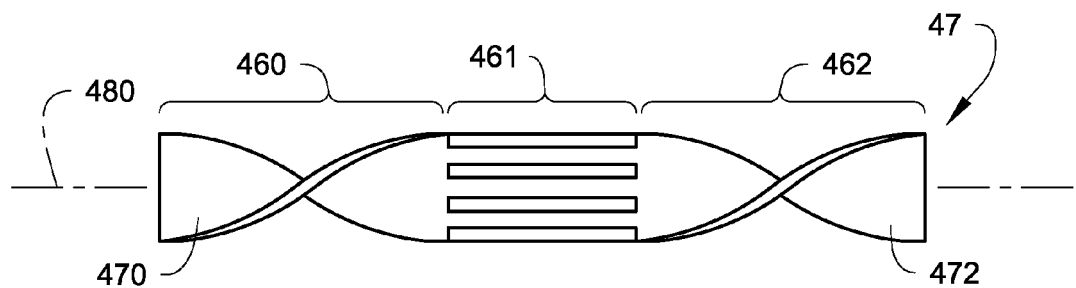
FIG. 4B is a side view of the mixer of FIG. 4A.

As illustrated in FIGS. 4A and 4B, an embodiment of a mixer 47 for mixing a fluid that enhances a chemical reaction may have a plurality of segments wherein each segment is configured to accomplish a particular function. For example, in FIGS. 4A and 4B, it is illustrated wherein a mixer 47 having three segments 460, 461, 462. However, it is envisioned that a mixer may have two or more segments. The segments being arranged in any order along a major axis of the mixer 47. In FIGS. 4A and 4B, it is illustrated wherein a first segment 460 has a mixer surface 470 having a helix-like configuration for turbulent mixing of a fluid. A third segment 462 also has a mixer surface 472 having a helix-like configuration for turbulent mixing of a fluid. A helix-like configuration may be a left-handed helix, a right-handed helix, or a combination of both. In this embodiment, a second segment 461 is positioned between the first segment 460 and the third segment 462 along a major axis of the mixer 47. The second segment 461 has at least one surface 490, and preferably more than one surface, wherein at least a portion of the surface supports a catalyst. Accordingly, an embodiment of a mixer 47 illustrated in FIGS. 4A and 4B allows for turbulent mixing of a fluid and at the same time enhances a chemical reaction of a fluid.

Figure 5A:
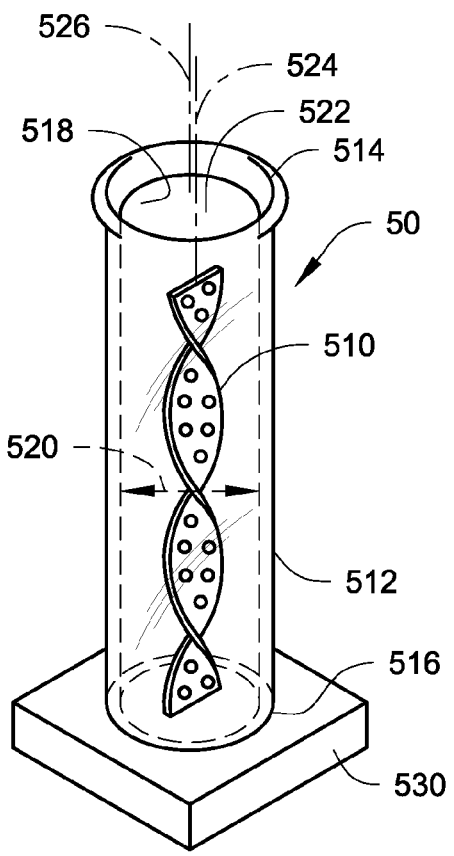
FIG. 5A is a perspective view of an embodiment of a mixer assembly illustrating a mixer inserted inside a fluid container, wherein the mixer has a helix-like configuration and structures configured to increase interaction of catalysts and the fluid, wherein the fluid container is in contact with a temperature control device.

Attention is now directed to FIG. 5A. FIG. 5A illustrates a mixer assembly 50 wherein the embodiment of the mixer 510 resembles the embodiment of FIG. 3A. The mixer assembly 50 illustrated in FIG. 5A includes an embodiment of a fluid container 512 having an opening end 514, a closed end 516, an inside surface 518, and an internal diameter 520. The mixer 510 is inserted into the internal region 522 of the fluid container 512 such that the mixer major axis 524 is parallel to the longitudinal central axis 526 of the fluid container 512.

FIG. 5A illustrates an embodiment of a configuration of a mixer assembly 50 having a temperature control device 530 that is positioned to be in contact with the fluid container 512. As shown in FIG. 5A, the temperature control device 530 is positioned at the bottom of the fluid container 512. Accordingly, heat energy may be transferred between the internal region 522 of the fluid container 512 and the temperature control device 530. For example, the temperature control device 530 may be configured to input heat energy to the fluid container 512, which in turn the fluid container 512 transfers heat energy to the internal region 522 of the fluid container 512. Thus fluid contained in the fluid container 512 could receive the transferred heat energy. The transferred heat energy may convert to kinetic energy to enhance molecular movement of reactant to achieve a higher energy state than the required activation energy level for a chemical reaction. Accordingly, this would enhance the overall chemical reaction within the mixer assembly 50.

It is also within the scope of this embodiment that heat may be transferred from the internal region 522 to the fluid container 512 and then from the fluid container 512 to the temperature control device 530. For certain chemical reactions known as exothermic reactions, excess energy results upon completion of a reaction to a product. The excess energy is often expressed as heat energy. Accordingly, it may be desirable to transfer the excess heat energy away from the chemical compounds. Thus, a temperature control device 530 may include a cooling feature such that the fluid container 512 is cooled to absorb the excess heat energy within the fluid. For example, such a temperature control device 530 may be used to keep the fluid at a constant temperature despite excess heat energy generated by the chemical reaction.

Figure 5B:
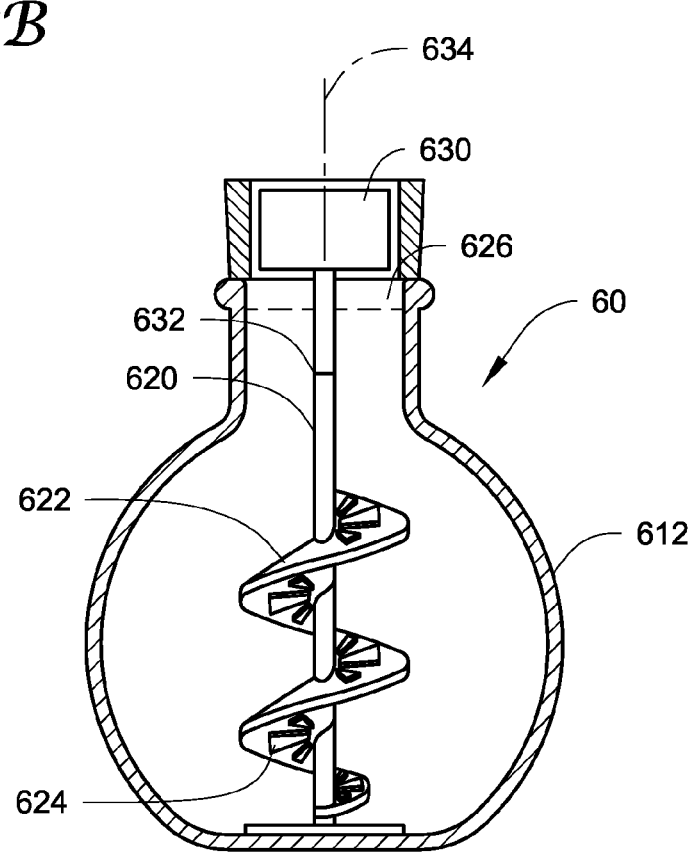
FIG. 5B is a cross-sectional view of a mixer assembly illustrating a mixer inserted inside a fluid container, wherein the mixer has a helix-like configuration and structures configured to increase interaction of catalysts and the fluid, further having a motor connected to the mixer.

FIG. 5B illustrates a mixer assembly 60 wherein a mixer 620 having a helix-like surface 622 is inserted inside a fluid container 612. The mixer surface structure has ridges 624 configured to increase interaction of catalysts and the fluid. Near an open end 626 of the fluid container 612 is a motor 630 connected to a first end 632 of the mixer 620. The activation of the motor 630 powers the rotation of the mixer 620 about the major axis 634 of the mixer 620. Although not illustrated, those skilled in the art would appreciate that other mixer embodiments disclosed herein may also be configured in this manner.

Figure 6A:
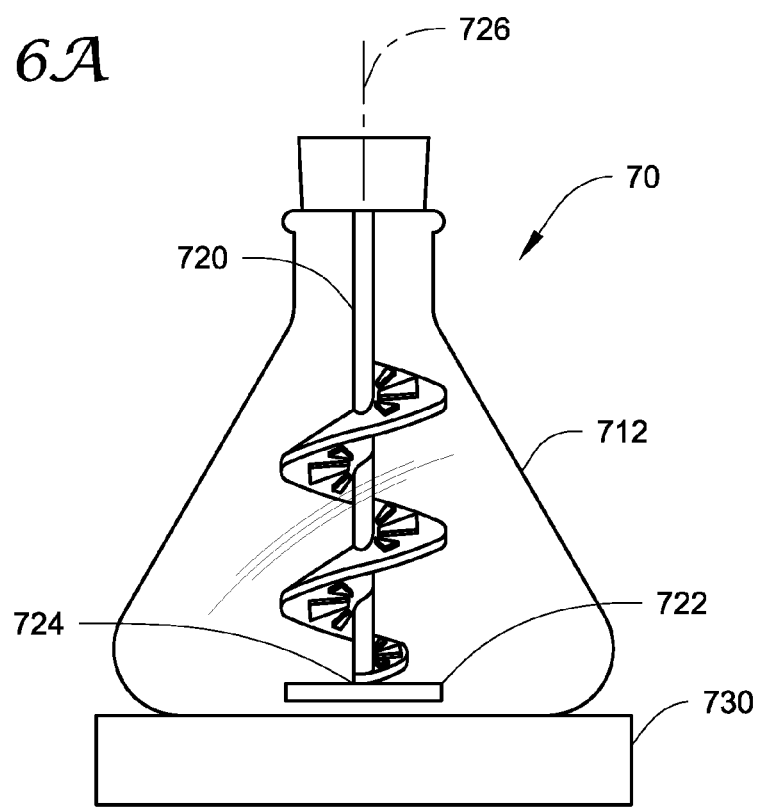
FIG. 6A is a side view of an embodiment of a mixer assembly illustrating a mixer inserted inside a fluid container, wherein the mixer has a helix-like configuration and ridged structures configured to increase interaction of catalysts and the fluid, further having a magnet connected at an end of the mixer, and a magnetic field generator positioned external to the fluid container.

FIG. 6A illustrates another embodiment of a mixer assembly 70 including a mixer 720 inserted inside an Erlenmeyer flask 712. The illustration of the Erlenmeyer flask 712 is only an example and other types of flasks having different shapes may also be used. The mixer 70 includes a magnet 722 connected at the mixer second end 724. In this particular embodiment, the magnet's poles are positioned perpendicular to the mixer major axis 726. Outside the flask 712 is a magnetic field generator 730 positioned near the magnet 722 connected to the mixer 720. The magnetic field generator 730, when activated, generates a magnetic field such that the magnet 722 connected to the mixer 720 is affected. The magnetic field generator 730 may affect the magnetic field such that the magnet 722 connected to the mixer 720 rotates about the mixer major axis 726. This rotation powers the mixing motion of the mixer 720 to cause turbulent mixing of a fluid contained in the flask 712.

Figure 6B:
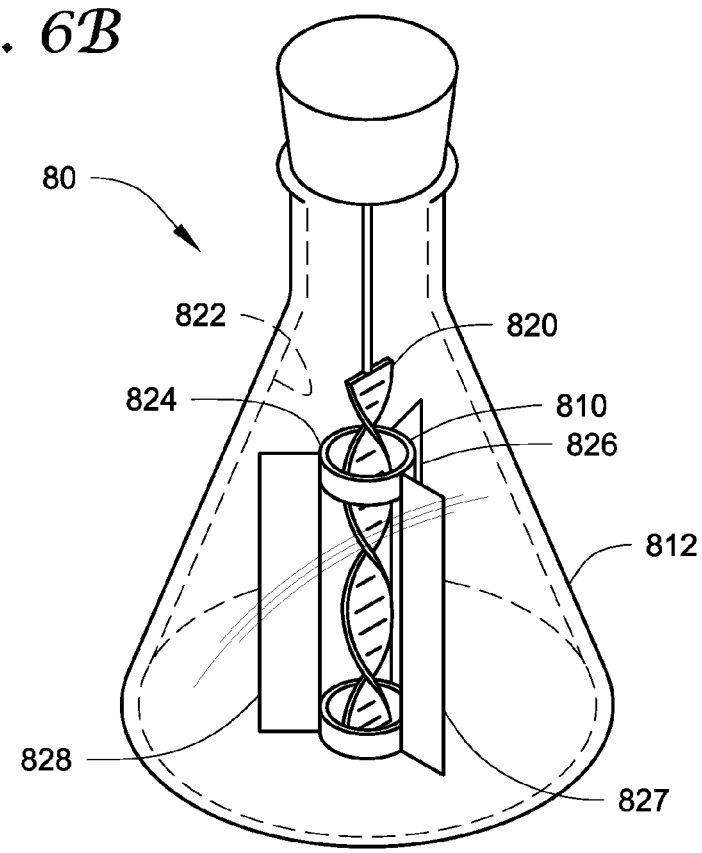
FIG. 6B is a perspective view of an embodiment of a mixer assembly illustrating a mixer inserted inside a fluid container, wherein the mixer has a helix-like configuration and ridged structures configured to increase interaction of catalysts and the fluid, further having a catalytic sleeve positioned radially between the mixer and the inside surface of the fluid container.

FIG. 6B illustrates another embodiment of a mixer assembly 80 wherein a catalytic sleeve 810 is inserted inside the fluid container 812, positioned radially between the mixer 820 and the inside surface 822 of the fluid container 812. The catalytic sleeve 810 has a ring like structure 824 and at least one sleeve surface 826 connected to the ring-like structure 824 which extends radially away from the ring-like structure 824 toward the inside surface 822 of the fluid container 812. At least a portion of the sleeve surface 826 supports a catalyst for enhancing a chemical reaction. A catalytic sleeve 810 is yet another embodiment wherein additional catalytic surface is introduced to reactants which may enhance the overall chemical reaction. Although FIG. 6B illustrates only three sleeve surfaces 826, 827, 828, those skilled in the art would appreciate that any number of sleeve surfaces may be utilized.

Figure 7A:
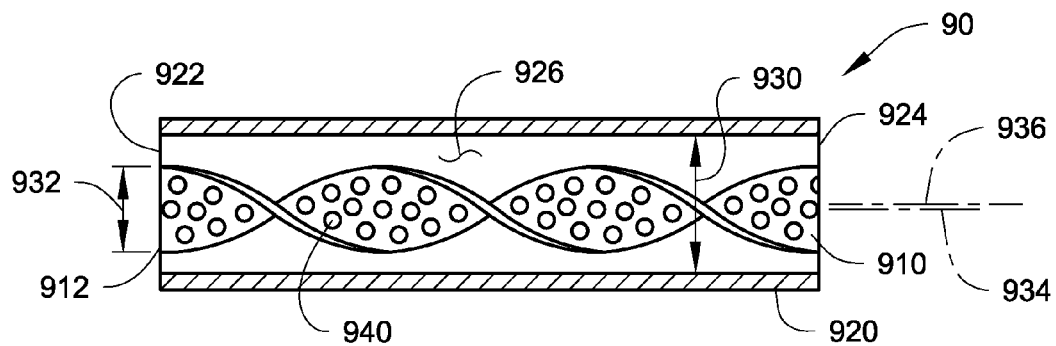
FIG. 7A is a longitudinal cross-sectional view of an embodiment of a mixer assembly for continuous mixing.

FIG. 7A illustrates yet another embodiment of a mixer assembly 90 for continuous mixing of a fluid. The mixer assembly 90 includes a mixer 910 inserted in a tube 920. The mixer 910 has a mixer surface 912 having a helix-like configuration. The tube 920 has a first end 922 where a fluid enters, and a second end 924 where a fluid exits. The tube 920 includes an internal region 926 having a mixer 912 and an internal diameter 930 of an internal region 926 that is greater than the length of mixer minor axis 932. The mixer 910 is positioned such that the mixer major axis 934 is parallel to the central tube axis 936.

As illustrated in FIG. 7A, a fluid enters the illustrated area from the first end 922. The mixer 910 having a helix-like surface 912 causes turbulent mixing of the fluid, wherein the mixer surface structure 940 supporting a catalyst enhances the chemical reaction of the fluid. As the fluid flows from the first end 922 of the tube 920 to the second end 924 of the tube 920, the structures of the mixer 910 may enhance the overall chemical reaction. An example of how this embodiment may be utilized by a large scale industrial machine is illustrated in FIG. 7B.

Figure 7B:
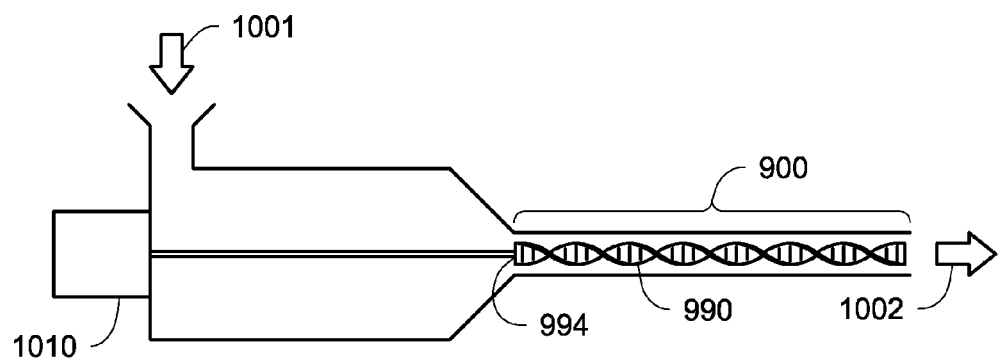
FIG. 7B is a cross-sectional view of an embodiment of a mixer assembly for continuous mixing.

FIG. 7B illustrates an embodiment having a mixer assembly tube 900. The first directional arrow 1001 indicates the input of a fluid containing reactants, for example. The second directional arrow 1002 indicates the output of a fluid containing products, for example. FIG. 7B also illustrates a motor 1010 connected to the mixer 990 at an end 994. The motor 1010 of FIG. 7B illustrates how the rotation of the mixer for turbulent mixing may be driven in this embodiment.

Generally, surface structures disclosed above are configured to increase interaction of catalyst and fluid. Accordingly, it is envisioned that surface structures of any of the embodiments disclosed above may be configured to be, for example and not limited to, raised portions, depressed portions, hemispherical bumps, hemispherical depressions, ridges, valleys, holes, or any combinations thereof. The surface structures may be regular in size or irregular in size. The surface structures may be regularly positioned on a surface or randomly positioned. Those skilled in the art would readily recognize and appreciate that other structures may also be utilized to achieve increased interaction between catalyst and fluid.

FIG. 8A is a cartoon diagram illustrating an industrial complex 1100, wherein certain parts of the industrial complex 1100 are zoomed-in to further illustrate cross-sectional portions 1150, 1160. An example of an industrial complex is a paper mill, but other types of industrial complexes will benefit from the advantages of the embodiments disclosed herein. Such an industrial complex 1100 may have various tube structures whereby various fluids are transported. Such tube structures may be configured with an embodiment of the present invention such that both turbulent mixing and catalytic reactions may lead to a reduction of harmful chemicals being released into the environment. For example, FIG. 8A illustrates a smokestack 1102 wherein an embodiment of the present invention is incorporated into. Such a smokestack 1102, having a tube structure 1104, may include a mixer 1106 having a surface 1108 configured for turbulent mixing of gas fluids as various gases are vented up the smokestack 1102. The various harmful gases that enter the smokestack 1102 at the lower end may react with a catalyst supported on the mixer 1106 as the mixer 1106 enhances turbulent mixing of the gases. The surface 1108 of the mixer 1106 has structures 1110 configured for increased contact between the catalyst and the harmful gas reactants. Thus, when the gas fluid exits the smokestack 1102 and into the environment, the amount of harmful gases may be significantly reduced.

The industrial complex 1250 illustrated in FIG. 8B also has a smoke stack 1260, which is zoomed-in to further illustrated a cross-sectional view 1280. The smoke stack 1260 is a tube-like structure 1262 for the flow of gaseous fluids from the industrial complex 1250 into the environment. The inside surface 1263 of the smoke stack 1260 has a plurality of tab-like structures 1264 that are stationary protrusions from the inside surface 1263 of the smoke stack 1260 and configured at an angle with respect to the inside surface 1263 of the smoke stack 1260 to cause turbulent mixing of the gaseous fluids. The inside surface 1263 of the smoke stack 1260 or the tab-like structures 1264 or both may support a catalyst to enhance a chemical reaction of the gaseous fluid flow for the treatment of the gaseous fluid.

Examples of various harmful gases that may be reduced according to the embodied methods include, but not limited to, carbon monoxide (CO), carbon dioxide ($CO_2$), nitrogen oxide ($NO_x$), and sulfur oxide ($SO_x$).

Many industrial complexes also have a waste flow pipe that lead to the environment, for example, a water source 1202, 1254. Examples of a water source 1202, 1254 include, but are not limited to, a lake or a river. Embodiment of a mixer assembly 1204 for treatment of waste effluents is illustrated in FIG. 8A wherein a mixer 1206 is inserted in a tube shaped pipe 1200. For example, the mixer 1206 has a surface 1208 configured for turbulent mixing, catalyst supported thereon, and surface of the mixer has a structure 1210 configured for increased contact between the catalyst and fluid as fluid flows down the pipe 1200.

FIG. 8B is another cartoon diagram illustrating an industrial complex 1250 having various tube structures which are zoomed-in to further illustrate cross-sectional portions 1280, 1290. For example, the industrial complex 1250 may have a tube structure for flow of effluents 1252 into the water source 1254. The tube structure for flow of effluents 1252 is configured with a mixer member 1256 having a helix-like configuration. The mixer member 1256 has a surface 1257 that supports a catalyst for treatment of the effluents. Thus, as harmful fluids flow from the industrial complex and down the pipe 1252, the mixer member 1256 of the present embodiment may enhance a chemical reaction within the pipe 1200. The enhanced reaction may result in better treatment of waste effluents. An example of such treatment of effluents include changing the pH of the effluent fluids such that the water source 1202 is impacted less by sudden changes of pH of the water source 1202, 1254 caused by outflow of effluent.

As an embodiment, a method for treatment of industrial effluents is disclosed. Industrial effluents may be harmful to the water source and living organisms therein. Thus, when such harmful fluids exit the industrial complex 1100, 1250 and down a pipe 1200, 1252 having, for example but not limited to, a tubular structure as disclosed above in FIGS. 8A and 8B, a mixer assembly is configured to enhance a chemical reaction within the pipe 1200, 1252 to reduce the amount of harmful chemicals by enhancing the treatment of the effluents. It may be preferable that a catalyst used in the method for treatment of industrial effluents is a type of a Noble metal or a Noble metal alloy. Noble metals are metals that are resistant to corrosion or oxidation, unlike most base metals. It may also be preferable that a catalyst used in the method of treatment of industrial effluents is a tetra-amido macrocyclic ligand molecule. Tetra-amido macrocyclic ligand molecules are catalysts that work with hydrogen peroxide and various other oxidants to break down a wide variety of pollutants. Iron complexes of tetraamido macrocyclic ligands molecules are also oxidation catalysts. It may also be preferable that a catalyst is a biological catalyst. A biological catalyst is a biological molecule having a catalytic effect. Examples of a biological catalyst include, but are not limited to, enzymes, a single strand or double strand DNA, RNA, Amino Acids, lipids, phospholipids, proteins, metalloproteins, coenzymes, and combinations thereof. Enzymes like peroxidases are preferable. Those skilled in the art would readily recognize and appreciate that other types of catalysts may also be utilized. One embodied method allows for an increase in the oxygen ($O_2$) concentration level in the effluents. Other embodied methods enhance a chemical reaction wherein certain chemicals are reacted into less harmful products. Examples of such methods include oxidation reactions and/or reduction reactions of certain nitrogen containing molecular ions in the effluent. Examples of nitrogen containing molecular ion include, for example, ammonium ($NH_4^+$), nitrate ($NO_3^-$) and nitrite ($NO_2^-$). Chemical reactions that may be enhanced in the method for treatment of industrial effluents include denitrification. Denitrification is a process of reducing nitrogen containing molecular ions into gaseous nitrogen ($N_2$). Other embodied methods treats the effluent such that the effluent has a pH, in the range of about 6.0 to about 8.5 as the effluent exits the pipe and into the water source. Those skilled in the art would readily recognize and appreciate that other types of chemical reactions may be enhanced for treatment of effluents from an industrial complex. A desired enhancement of a chemical reaction depends on the variety of types of chemicals within a particular waste effluent from a particular industrial complex. Accordingly, those skilled in the art would also readily recognize what catalysts may be used to achieve enhancing a desired chemical reaction of the fluid.

Figure 9:
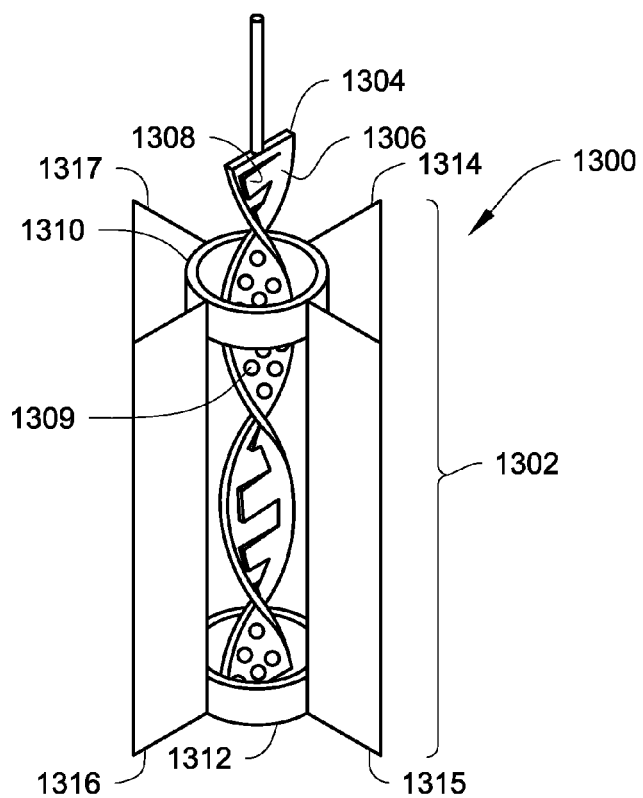
FIG. 9 is a perspective view of an embodiment of a mixer with a catalytic sleeve.

FIG. 9 illustrates an embodiment of a mixer 1300 with a catalytic sleeve 1302. FIG. 9 illustrates a mixer member 1304 having a surface 1306 configured for turbulent mixing, further having a helix-like configuration, wherein the surface includes surface structures 1308, 1309 configured for increased contact of catalyst supported thereon with a fluid. The embodiment illustrates alternating ridge-and-valley surface structures 1308 and repeating hemispherical raised structures 1309 on the surface 1306 of the mixer member 1304. Further, FIG. 9 illustrates an embodiment of a catalytic sleeve 1302 according to at least one aspect of the invention. The catalytic sleeve 1302, as illustrated, includes a first ring-like structure 1310 and a second ring-like structure 1312. Four sleeve surface structures 1314, 1315, 1316, 1317 are connected to a first ring-like structure 1310 and also the second ring-like structure 1312. The sleeve surface structures radiate 1314, 1315, 1316, 1317 outward from the ring-like structures 1310, 1312. At least a portion of the sleeve structures 1314, 1315, 1316, 1317 include a catalyst supported thereon. Although the sleeve surface structures 1314, 1315, 1316, 1317 are illustrated as generally planar square surfaces, the surface structures may have a variety of shapes and need not be planar. Those skilled in the art would readily recognize and appreciate that other shapes and structures may also be utilized. Those skilled in the art would also readily recognize that different numbers of sleeve surface structures may also be utilized. For example, a catalytic sleeve may include multiple ring-like structures and/or multiple sleeve surface structures.

Figure 10:
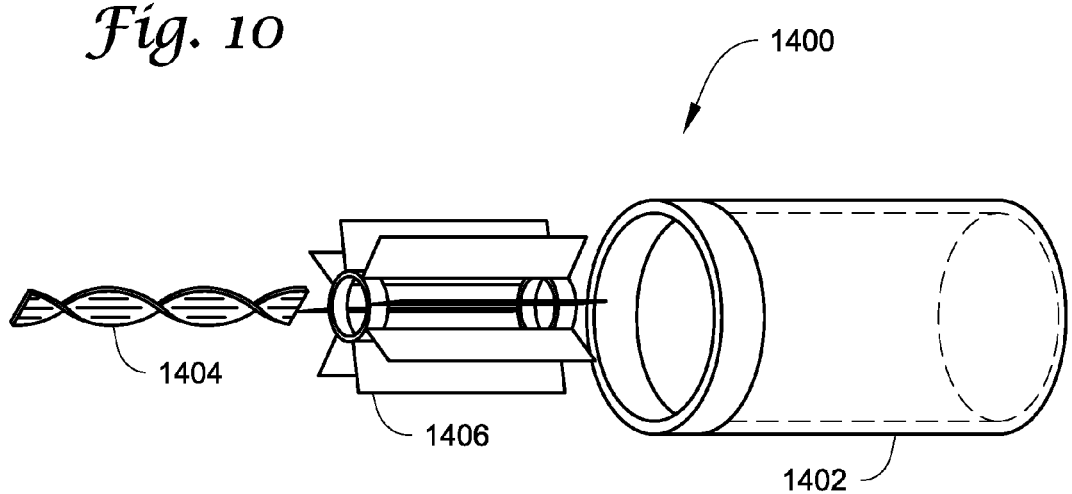
FIG. 10 is an exploded view of an embodiment of a mixer assembly including a catalytic sleeve.

Now referring to FIG. 10, the embodiment illustrated therein is an exploded view of a mixer assembly 1400 including a tube 1402, a mixer member 1404, and a catalytic sleeve 1406. In this respect, another advantage of this embodiment may be better understood. Although generally a catalyst is not consumed in an overall chemical reaction, in practice, a catalyst may become less effective after many uses. For example, a catalyst may become oxidized whereupon the electron transfer characteristic of the catalyst may be reduced. As another example, a catalyst may become coated with undesirable non-reactant chemicals, thus preventing contact between the catalyst and reactants after a period of use. As yet another example, for a biological catalyst, the biological materials may degenerate after a period of use. Accordingly, it would be desirable to recharge, clean, or redeposit catalysts in order to continue to enhance a chemical reaction using a mixer assembly 1400. A mixer assembly 1400 that includes a mixer member 1404 and a catalytic sleeve 1406 as illustrated in FIG. 10 would, for example, allow the user to remove and separate the mixer member 1404 and the catalytic sleeve 1406 from the tube 1402 for reactivating, recharging, cleaning, and/or replacing a catalyst. This may be particularly advantageous if the tube 1402 is a part of an industrial complex or a part of a complex device such that accessing the inner surface of the tube 1402 may be difficult. Those skilled in the art would also readily recognize and appreciate other advantages of the embodiment.

A preferred embodiment has been described for illustrative purposes. Those skilled in the art will appreciate that various modifications and substitutions are possible without departing from the scope of the invention, including the full scope of equivalents thereof.

What is claimed:

1. A mixer for mixing a fluid and enhancing a chemical reaction, comprising:
   a mixer first end;
   a mixer second end;
   a mixer major axis extending from the mixer first end to the mixer second end;
   a mixer minor axis that is perpendicular to the mixer major axis;
   a mixer surface configured to turbulently mix the fluid;
   the mixer surface having a catalyst; and
   a surface structure being on the mixer surface, wherein the surface structure is configured to increase turbulent interaction of said catalyst and the fluid,
   wherein at least a portion of the surface structure comprises the catalyst.

2. The mixer according to claim 1, further comprising:
   a first segment, wherein the mixer surface is on the first segment; and
   a second segment comprising:
      a second surface configured to turbulently mix the fluid, wherein at least a portion of the second surface comprises:
         a catalyst supported on the portion of the second surface, and
         a second surface structure on the second mixer surface,
      wherein the second surface structure is configured to increase turbulent interaction of said catalyst and the fluid,
      wherein the second mixer surface is a right-handed helix-like twisting configuration around the mixer major axis;
   wherein the first segment and the second segment are linearly connected and parallel to the mixer major axis,
   wherein the mixer surface of the first segment is a left-handed helix-like twisting configuration around the mixer major axis.

3. The mixer according to claim 1, further comprising a catalytic sleeve comprising:
   a ring-like structure; and
   at least one sleeve surface connected to the ring-like structure and extending radially away from the center of the ring-like structure;
   wherein at least a portion of the sleeve surface comprises the catalyst supported thereon;
   wherein the mixer is positioned inside the ring-like structure.

4. The mixer according to claim 1, further comprising:
   a central rod that defines the mixer major axis, wherein the mixer surface further is connected to the central rod and twist around the central rod in a helix-like configuration.

5. An assembly for batch mixing a fluid and enhancing a chemical reaction comprising the mixer according to claim 1, further comprising:
a fluid container comprising:
an opening end,
a closed end,
a central axis extending from the opening end to the closed end,
an internal region,
an inside surface, and
an internal diameter of the internal region perpendicular to the central tube axis;
wherein the internal diameter of the internal region is greater than or equal to the mixer minor axis;
wherein the mixer is inserted into the internal region of the fluid container such that the mixer major axis and the central axis are parallel to each other.

6. The assembly according to claim 5, wherein the mixer surface further comprises a helix-like configuration.

7. The assembly according to claim 6, further comprising a motor connected to the mixer first end.

8. The assembly according to claim 6, further comprising a magnet attached at the mixer second end; and
a magnetic field generator positioned outside the fluid container;
wherein when the magnetic field generator is activated, the magnet attached to the mixer second end is affected and causes the mixer to rotate about the mixer major axis.

9. The assembly according to claim 6, further comprising a catalytic sleeve, positioned radially between the mixer and the fluid container, comprising:
a ring-like structure;
at least one sleeve surface connected to the ring-like structure and extending radially from the ring-like structure toward the inside surface of the fluid container;
wherein at least a portion of the sleeve surface comprises a catalyst supported thereon.

10. The assembly according to claim 5, further comprising a temperature control device positioned to be in contact with the fluid container, wherein the fluid container is further configured to transfer heat between the internal region and the temperature control device.

11. An assembly for continuous mixing of a fluid and to enhance a chemical reaction comprising the mixer according to claim 1, further comprising:
a tube comprising:
a first tube end,
a second tube end,
a central tube axis extending from the first end to the second end,
an internal region,
an inside surface, and
an internal diameter of the internal region perpendicular to the central tube axis;
wherein the internal diameter of the internal region is greater than or equal to the mixer minor axis;
wherein the mixer is inserted into the internal region of the tube such that the mixer major axis and the central tube axis are parallel to each other.

12. The assembly according to claim 11, wherein the surface of the mixer surface further comprises a helix-like configuration.

13. The assembly according to claim 12, further comprising a temperature control device positioned to be in contact with the tube, wherein the tube is configured to transfer heat between the internal region and the temperature control device.

14. The assembly according to claim 12, further comprising a catalytic sleeve, positioned radially between the member and the fluid container, comprising:
a ring-like structure; and
at least one sleeve surface connected to the ring-like structure and extending radially from the ring-like structure toward the inside surface of the fluid container;
wherein at least a portion of the sleeve surface comprises the catalyst supported thereon.

15. The mixer according to claim 1, wherein the catalyst is selected from the group consisting of noble metal, tetra-amido macrocyclic ligand molecule, iron complex of a tetra-amido macrocyclic ligand molecule, and biological catalyst.

16. The mixer according to claim 9, wherein the catalyst is selected from the group consisting of noble metal, tetra-amido macrocyclic ligand molecule, iron complex of a tetra-amido macrocyclic ligand molecule, and biological catalyst.

17. The mixer according to claim 14, wherein the catalyst is selected from the group consisting of noble metal, tetra-amido macrocyclic ligand molecule, iron complex of a tetra-amido macrocyclic ligand molecule, and biological catalyst.

18. The mixer according to claim 1, wherein the surface structure includes a protruding structure radiating away from the mixer major axis, the protruding structure having a base directly connected to the mixer surface, and an end distanced radially and axially from the base at an angle.

19. An assembly for continuous mixing a fluid and to enhance a chemical reaction, comprising:
a mixer comprising:
a mixer first end,
a mixer second end,
a mixer major axis extending from the mixer first end to the mixer second end,
a mixer minor axis that is perpendicular to the mixer major axis, and
a mixer surface,
wherein the mixer surface has a helix-like configuration configured to turbulently mix the fluid; and
a tube comprising:
a first tube end,
a second tube end,
a central tube axis extending from the first end to the second end,
an internal region, and
an inside surface, comprising:
at least one inside surface structure,
a catalyst supported on at least a portion of the inside surface structure,
wherein the inside surface structure is configured to increase interaction of said catalyst and the fluid, and
an internal diameter of the internal region perpendicular to the central tube axis,
wherein the internal diameter of the internal region is greater than or equal to the mixer minor axis;
wherein the mixer is inserted into the internal region of the tube such that:
the mixer major axis and the central tube axis are parallel to each other.

* * * * *